(12) United States Patent
De Luca et al.

(10) Patent No.: US 10,822,736 B2
(45) Date of Patent: Nov. 3, 2020

(54) HOUSEHOLD APPLIANCE WITH A TOUCH DISPLAY

(71) Applicant: Electrolux Appliances Aktiebolag, Stockholm (SE)

(72) Inventors: Fernando De Luca, Porcia PN (IT); Paolo Quattrin, Porcia PN (IT); Marie Lambertsson, Stockholm (SE)

(73) Assignee: ELECTROLUX APPLIANCES AKTIEBOLAG (SE)

( * ) Notice: Subject to any disclaimer, the term of this patent is extended or adjusted under 35 U.S.C. 154(b) by 0 days.

(21) Appl. No.: 16/328,982

(22) PCT Filed: Jul. 26, 2017

(86) PCT No.: PCT/EP2017/068853
§ 371 (c)(1),
(2) Date: Feb. 27, 2019

(87) PCT Pub. No.: WO2018/041481
PCT Pub. Date: Mar. 8, 2018

(65) Prior Publication Data
US 2019/0194857 A1 Jun. 27, 2019

(30) Foreign Application Priority Data
Aug. 31, 2016 (EP) .................................... 16186629

(51) Int. Cl.
*D06F 34/28* (2020.01)
*D06F 33/00* (2020.01)
(Continued)

(52) U.S. Cl.
CPC .............. *D06F 34/28* (2020.02); *D06F 33/00* (2013.01); *G06F 3/0362* (2013.01); *G06F 3/0482* (2013.01); *G06F 3/04883* (2013.01)

(58) Field of Classification Search
CPC ........ D06F 34/28; D06F 33/00; G06F 3/0362; G06F 3/0482; G06F 3/04883
See application file for complete search history.

(56) References Cited

U.S. PATENT DOCUMENTS 6,553,595 B1 * 4/2003 Bruntz .................. D06F 35/006
8/158
6,556,222 B1 * 4/2003 Narayanaswami .. G04G 9/0064
368/295

(Continued)

FOREIGN PATENT DOCUMENTS

| JP | 2015062535 A | 4/2015 |
| WO | 2012092445 A2 | 7/2012 |

OTHER PUBLICATIONS

International Search Report and Written Opinion for International Application No. PCT/EP2017/068853, dated Nov. 7, 2017—10 pages.

*Primary Examiner* — Amy Onyekaba
(74) *Attorney, Agent, or Firm* — RatnerPrestia

(57) ABSTRACT

A household appliance having a control panel, a control unit, and a touch display connected to the control unit. The control unit is configured to contemporaneously display a plurality of operating functions on the touch display and to receive and to process user input, whereby the touch display displays a plurality of operating functions, among them a highlighted operating function, whereby each of the displayed operating functions is selectable by touching it at least one time.

14 Claims, 3 Drawing Sheets

(51) Int. Cl.
*G06F 3/0362* (2013.01)
*G06F 3/0482* (2013.01)
*G06F 3/0488* (2013.01)

(56) References Cited

U.S. PATENT DOCUMENTS

| | | | | |
|---|---|---|---|---|
| 7,337,634 B2* | 3/2008 | Buckroyd | ............... | D06F 34/28 68/12.23 |
| 10,452,243 B2* | 10/2019 | Fagan | ................ | G06F 3/04847 |
| 2002/0078511 A1* | 6/2002 | Blair | ....................... | D06F 34/28 8/159 |
| 2002/0116959 A1* | 8/2002 | Ohta | ....................... | D06F 34/28 68/12.27 |
| 2002/0128729 A1* | 9/2002 | Blair | ..................... | G05B 19/108 700/19 |
| 2003/0024055 A1* | 2/2003 | Broker | ..................... | D06F 39/06 8/158 |
| 2003/0024057 A1* | 2/2003 | Herr | ....................... | D06F 34/28 8/159 |
| 2003/0025733 A1* | 2/2003 | Broker | ................. | G06F 3/0482 715/765 |
| 2003/0028259 A1* | 2/2003 | Hood | ...................... | D06F 34/28 700/17 |
| 2003/0041388 A1* | 3/2003 | Vande Haar | .......... | D06F 35/006 8/158 |
| 2003/0051296 A1* | 3/2003 | Broker | ................. | D06F 35/006 8/158 |
| 2003/0154560 A1* | 8/2003 | Behrens | ................. | D06F 34/28 8/159 |
| 2004/0095370 A1* | 5/2004 | Broker | ..................... | G09G 5/30 715/705 |
| 2008/0235613 A1* | 9/2008 | Ricklefs | ............. | G05B 19/0426 715/779 |
| 2008/0235614 A1* | 9/2008 | Ricklefs | ............. | G05B 19/0426 715/783 |
| 2010/0126493 A1* | 5/2010 | Gokceimam | ........... | D06F 34/28 126/273 R |
| 2012/0042697 A1* | 2/2012 | Hong | ...................... | D06F 33/00 68/12.23 |
| 2012/0056827 A1* | 3/2012 | Kim | ........................ | D06F 34/32 345/173 |
| 2013/0235000 A1* | 9/2013 | Lee | ........................ | G06F 3/0362 345/184 |
| 2013/0290902 A1* | 10/2013 | Martin | .................... | D06F 34/28 715/823 |
| 2014/0062278 A1* | 3/2014 | Lyszus | .................. | A47B 96/00 312/294 |
| 2014/0236328 A1* | 8/2014 | Kamon | .................... | D06F 33/00 700/90 |
| 2014/0300450 A1* | 10/2014 | Ha | ........................... | G08C 17/02 340/6.1 |
| 2014/0303783 A1* | 10/2014 | Ha | .......................... | D06F 33/00 700/275 |
| 2015/0299929 A1* | 10/2015 | Yang | .................... | H01H 19/025 362/23.1 |
| 2016/0026365 A1* | 1/2016 | Sasaki | ................ | G06F 3/04845 715/735 |
| 2016/0187975 A1* | 6/2016 | Drescher | ................ | G06F 3/044 345/174 |
| 2016/0194805 A1* | 7/2016 | De Pellegrin | ......... | D06F 29/005 312/237 |
| 2016/0201248 A1* | 7/2016 | Kim | ....................... | D06F 39/02 8/137 |
| 2016/0215430 A1* | 7/2016 | Ha | ...................... | H04L 12/2834 |
| 2019/0003102 A1* | 1/2019 | Lv | .......................... | D06F 34/28 |

* cited by examiner

HOUSEHOLD APPLIANCE WITH A TOUCH DISPLAY

FIELD OF THE INVENTION

The present invention concerns the field of household appliances. In particular, the present invention refers to a household appliance with a control unit and a touch display.

BACKGROUND ART

Nowadays the use of household appliances, especially laundry treatment machines, both "simple" laundry washing machines (i.e. laundry washing machines which can only wash and rinse laundry) and laundry washing-drying machines (i.e. laundry washing machines which can also dry laundry), or drying machines (i.e. drying machines which can dry laundry) is widespread.

Laundry machines such as washing machines, dryers, especially tumble dryers, and combined washers/dryers typically comprise a user interface which can be, for instance, arranged on a front of control panel. The user interface typically provides several user interface elements for selecting or inputting a desired laundry treatment program and/or related parameters for this program. The user interface can also provide symbols, lights, displays or other indicators which allow giving the user a feedback on the selected choices. Switches, push knobs, and rotary knobs are often used as selecting devices for a treatment program among a set of available programs.

Usually in a household appliance, selection of the program, is done through a direct operation such as pointing a knob to a graphic, rotating a knob to select a cycle or pressing a button up to an appropriate selection. Operating the household appliance in this way has usually some drawbacks. Space is needed on the control panel to fit all possible selections. If space is an issue, the only alternative is to show one or very few programs in a text display, losing the perception of all the possible cycles or programs that actually are available in the appliance.

The user interface or control panel can also comprise a touch screen on which the user by touch interactions such as single touches or various swipe motions can interact with the household appliance. In a household appliance, space for the control panel is usually limited, and in some cases wide, but not so high. For this reason, space for controls and feedbacks, has to be optimised as much as possible.

The U.S. Pat. No. 7,337,634 B2 describes a control interface for a laundry appliance with a reconfigurable display on which at least one graphical icon symbol and text corresponding to the at least one graphical icon symbol can be displayed.

SUMMARY OF THE INVENTION

The aim of the invention is to provide a household appliance which provides a reliable and intuitive accessibility of its control via a touch screen.

The invention relates to a household appliance comprising a control panel and a control unit and a touch display connected to the control unit, whereby the control unit is configured to contemporaneously display a plurality of operating functions on the touch display and to receive and to process user input, whereby the touch display displays a plurality of operating functions, among them a highlighted operating function, whereby each of the displayed operating functions is selectable by touching it at least one time.

Preferred embodiments of the invention are described in relation to the dependent claims and the description of the enclosed drawings.

The invention is based on the consideration that by the available space on the control panel, the user should be enabled to obtain an overview on the available programs or cycles she or he can choose and the same time should be at any point during the interaction with the appliance be informed on the presently selected choices, thereby preventing a wrong selection and too much time needed to configure the machine for the desired cycle.

Applicant has found that the accessibility of the available operating modes is strongly enhanced if the display shows a plurality of them contemporaneously while always one of them is highlighted. In this way, the user is never in doubt on the currently selected function and at the same time has the overview about available selections.

The highlighted operating function preferably is the currently selected operation function. It is preferably especially the currently selected function if the user has touched it at least one time.

The control unit preferably is configured to receive a selection of a displayed operating function in several ways. The user touches one of the displayed operating functions, either a non-highlighted operating or the highlighted operating function, which is thereby selected. The highlighted function is selected after a timeout, i.e. after a prescribed time interval during which the operating was highlighted and during which the user did not touch any other operating function.

The control unit preferably comprises a microprocessor.

The highlighting of the highlighted operating function is preferably displayed brighter than the other displayed operating functions and/or in a larger font and/or in a different font and/or font style such as bold, italics, underlined and/or larger spaces between letters. In addition or alternatively, the background of the highlighted operating function can be chosen differently than the adjacent background.

Preferably said operating functions are washing programs selectable by the user. The household appliance in this case preferably is a laundry treatment appliance such as a washing machine or a combined washer/dryer. The washing programs preferably correspond to different laundry treatment processes with different parameters/options such a temperature, spinning speed, duration, etc. Examples for washing programs are "Wool", "Cotton", "Linen", "Silk", "Steam refresh", "Economy", "Synthetics", "Delicates", etc. In this way, the touch display shows a plurality of washing programs at once, giving the user an overview on possible choices.

In a preferred embodiment, if a washing program is selected, the touch display shows a summary screen for the program showing at least one option of the program. The summary screen preferably displays at least two options related to the program which the user can change/alter.

Preferably, the summary screen does not show the non-selected washing programs. In this way, the attention of the user is guided towards the selected washing program and its options only and is not disturbed by other information.

Advantageously, the appliance comprises a start button, whereby if the program is selected or if the summary screen for the selected program is shown, the appliance starts the program if the start button is pressed. The appliance preferably then performs the laundry treatment procedure corresponding to this program with the current values of the options for this program. The selection of the program in the program screen and the summary screen are clear indications for the user which program is to be started.

The start button is preferably a start/pause button by which under specified conditions a running cycle or program can be stopped.

In a preferred embodiment, if the summary screen is shown, if a specified user interaction is performed, the plurality of programs is shown. In this way, the user can conveniently view again the several washing programs available in case he would like to reconsider his choice of the washing program.

The specified user interaction preferably is a swipe motion. On the summary screen, a swipe motion will therefore intuitively make available the plurality of washing programs. The control unit is therefore configured to detect a swipe motion when the summary screen is shown.

Preferably, the washing programs are shown as a swipeable list. When the total or maximum number of available washing programs cannot be displayed simultaneously on the touch display, by a swipe motion the user can move the list, making entries visible which before were not displayed. The control unit therefore is configured to detect a swipe motion and accordingly adjust the display of the list. Preferably, the required swipe motion is located in a specified region which most preferably has full or great overlap with the region on the touch display on which the list is displayed. The list can have one or two ends. When they are reached, a swipe motion does not result in a further scrolling of the list. The list can also be arranged like a ring in such a way that it scrolls continuously and that entries are shown again when all other entries have been scrolled through.

The highlighted washing program is preferably displayed essentially in the center or middle of this list and thereby is clearly visible to the user.

In a preferred embodiment, the list of washing programs is a vertically arranged or vertical list. The various washing programs are preferably displayed in a vertical column. The swipe motion for moving washing programs up or down is preferably an essentially vertical swipe motion. Preferably, laterally to this vertical list, at least one option related to the currently selected washing program is displayed, preferably as a symbol and/or a value, that corresponds/relates to the currently highlighted program. When the user selects a washing program, preferably options are displayed in a separate screen in a horizontal list.

In an alternative embodiment, the list of washing programs is a horizontally arranged or horizontal list. The various washing programs are preferably displayed in a horizontal line. The swipe motion for moving entries left or right is preferably an essentially horizontal swipe motion.

In a preferred embodiment, the operating functions or other operating functions are options selectable by the user. Preferably, the operating functions are associated with a screen. Preferably, programs are shown in a program screen and options are shown in an options screen provided on the touch display.

Advantageously, at least one of said option comprises an option symbol and/or option text and/or an option value.

Preferably, if an option is selected, an options screen is displayed showing a plurality of option values of which one is highlighted, whereby an option value is selectable by touching it at least one time and/or by a timeout. The option values can be numerical values or symbols or words which symbolize quantities or settings. For example, for several discrete values of a quantity can be labeled from a lower point in a range to a higher point in that range. These labels, for instance, can be chosen to be the terms "low", "medium", "high".

The plurality of option values is preferably displayed as swipeable a list.

This list of option values preferably is horizontally arranged. The main or currently selected program is advantageously contemporaneously shown together with at least one option on an upper side of the screen.

The options screen preferably comprises two touch fields which among touch lead to a scrolling of the option values to the left or right in case the end of the row is not reached, thereby changing the highlighted value. In this way, the user can change the highlighted value by pressing the respective touch field. The touch field preferably comprises a symbol which indicates the direction in which the displayed values are shifted once being pressed.

The symbol is preferably an arrow.

Advantageously, when a highlighted option value is touched, a summary screen is shown with this option value being displayed.

The options screen preferably comprises a back symbol, whereby when this back symbol is touched, a summary screen is shown.

Preferably, the appliance comprises a start button, whereby when an option value is highlighted and when the start button is pressed, the appliance starts the selected program with the highlighted option value.

Preferably, the household appliance is configured to display two screens with operating functions among which one of the operating functions is highlighted as described above. One screen is displaying washing programs, the other screen is displaying option choices/values related to these washing programs. Preferably, the washing programs are displayed as a swipeable vertical list and the options are displayed as a horizontal list.

Advantageously, the appliance comprises an on/off button for turning on/off said touch display and/or the appliance. The on/off button therefore can turn on the appliance only, the touch display only or the appliance and the touch display essentially contemporaneously or with a, preferably short, time delay between turning on the appliance and turning on the touch display.

Preferably, when the display and/or the appliance is turned on, the program screen is displayed. This preferably means that if the user does not make any interaction, the program screen is the screen which is shown and stays and which preferably remains at least until a first user interaction has taken place. Optionally, before the program screen is shown, a splash screen and/or a welcoming message are shown.

In a preferred embodiment, on the control panel a rotary knob is arranged, whereby turning the knob allows changing the highlighted operating function, especially the highlighted washing program and/or highlighted option value. In this way, the user has another possibility to select the desired program and/or option value. In this application, the term "option value" does include numerical quantities such as water temperature or spinning speed as well as representations of one or more of these quantities such as "low", "medium", high".

The touch display in a preferred embodiment has a base which is larger than the height. It preferably has a rectangular shape. It is preferably arranged on/In the appliance in a way that its height is aligned vertically and its base or width is aligned horizontally.

In a preferred embodiment, the washing programs are arranged in a vertical list, while the option values are arranged in a horizontal list.

The household appliance preferably is a washing machine, a dryer or a combined washer/dryer.

The invention also relates to a household appliance comprising a control panel and a control unit and a touch display connected to said control unit, whereby said control unit is configured to contemporaneously display a plurality of operating functions on said touch display and to receive and to process user input, whereby an option screen is displayed showing a plurality of option values for a washing program of which one option value is highlighted. The preferred embodiments for the options screen described above are also preferred embodiments of this household appliance.

The advantages of the invention are especially as follows. By contemporaneously displaying operating functions which are selectable, it is possible to see several programs on a screen. By providing a touch display it is not needed to have mechanical control panel elements to select programs, like knob, LEDs, printed graphics, buttons etc. Once a function such as a program has been selected, the full display can be used to show other consumer relevant elements. Through direct access, i.e. by touching a non-highlighted entry, the user can select programs even if not in the focus area. The arrangement of washing programs in a vertical list poses no or only little space requirements on the length of the description. A horizontal arrangement of option values, especially since typically they are not very long words or symbols, allows conveniently presenting several of them at once on the screen. This optimisation of the space available in the display results in a user friendly user interface.

BRIEF DESCRIPTION OF THE DRAWINGS

Further features and advantages of the present invention shall become clearer from the following detailed description of some of its preferred embodiments, made with reference to the attached schematic drawings and given as an indication and not for limiting purposes.

In particular, the attached drawings are included to provide a further understanding of the invention and are incorporated in and constitute a part of this specification. The drawings together with the description explain the principles of the invention. In the drawings, corresponding characteristics and/or components are identified by the same reference numbers. In these drawings:

In FIG. 1 a laundry treatment appliance 2 is shown which is built as a front-loading washing machine and comprises housing or casing 6 with a preferable parallelepiped shape, the casing 6 comprising a front wall 10, two side walls 14, a cover plate 20 and a rear wall (not shown). Front wall 10 and side walls 14 are preferably part of a cabinet. A front door 24 is provided which can be opened for loading or unloading laundry through an opening 28 into a washing drum and which can be closed. Door 24 can be preferably operated, especially opened and closed, by a handle.

Advantageously a washing tub is contained within casing 6, whereby a rotatable and perforated drum is contained by the washing tub. Both washing tub and drum have a substantially cylindrical shape. Advantageously the tub is suspended in a floating manner inside casing 6 by means of a number of coil springs and shock absorbers. The drum is rotated by an electric motor, which transmits the rotating motion of a motor shaft to the drum by a belt/pulley system. In a different embodiment of the invention, the motor can be directly associated with the shaft of the drum. The tub is preferable connected to casing 6 by means of an elastic bellows or gasket. The tub preferably comprises two complementary hemi-shells structured for being reciprocally coupled to form tub.

Alternatively, the laundry appliance can be a combined washer and dryer or a dryer, in latter case the tub is not provided.

Figure 1:
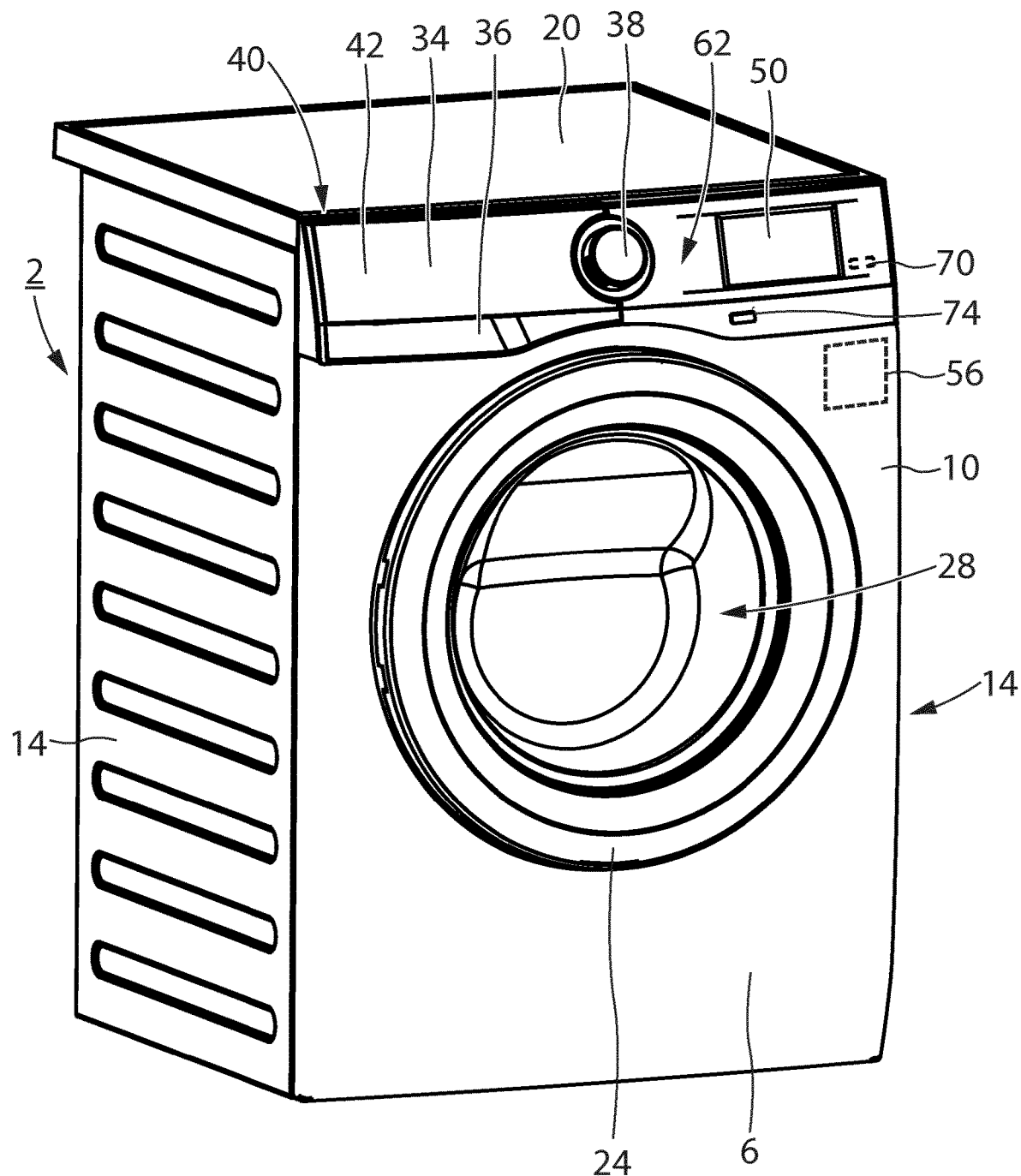
FIG. 1 shows a front loading washing machine with a control panel and a touch display in a preferred embodiment.

The preferred washing machine shown in FIG. 1 on a front panel 40 comprises a drawer 42 with a front plate 34 and a handle 36 for pulling out and pushing back the drawer 42. Drawer 42 comprises at least one compartment for receiving detergent or washing additives. Adjacent to drawer 42, preferably a rotatable or rotary knob 38 is arranged for selecting a laundry treatment program and/or at least one parameter of a laundry treatment program. Preferably, knob 38 has also a push-functionality and can be pressed for selected and/or confirmation of selected options. Knob 38 is provided on a control panel 62 which can provide further indicating and/or control elements (not shown). Knob 38 is preferably arranged on front panel 40 adjacent to drawer 42.

On control panel 62, a touch display 50 is arranged. A control unit 56 is indicated which is connected to touch display 50.

Figure 2:
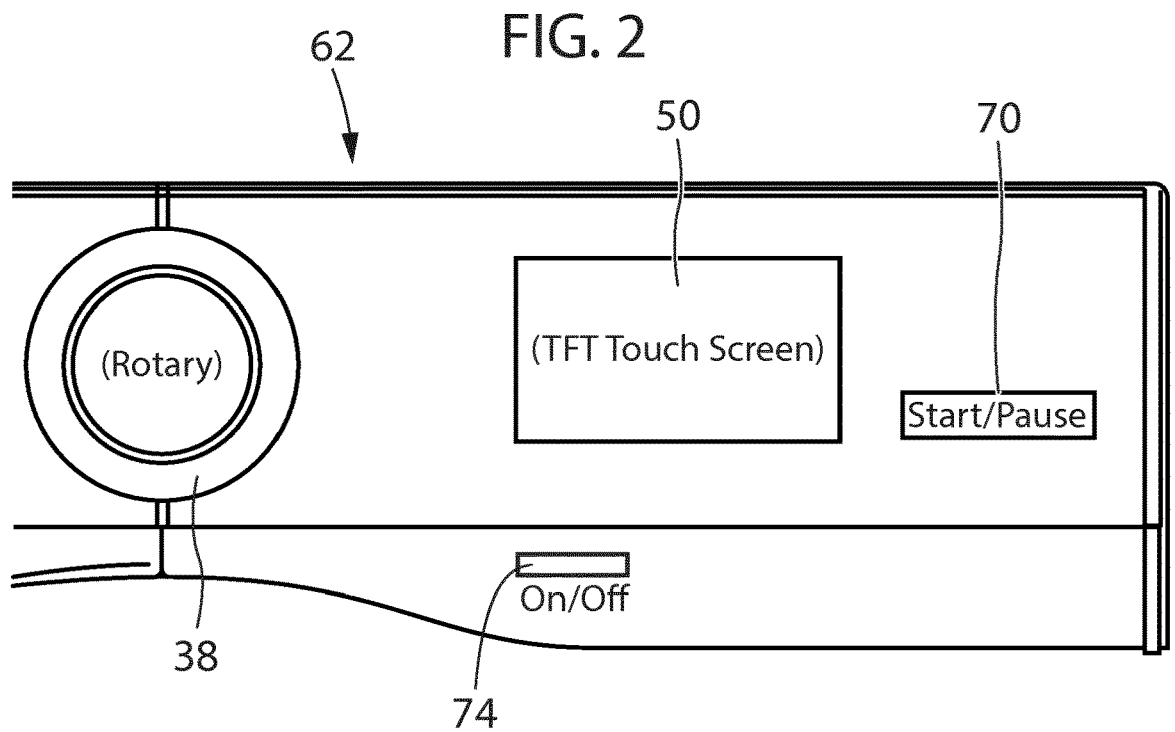
FIG. 2 shows the control panel of the washing machine according to FIG. 1.

FIG. 2 shows an enlarged view of control panel 62 of appliance 2. Control panel 62 further comprises a start/pause button 70 and an on/off button 74. When the start/pause button 70 is pressed by the user and if no washing program is active or currently running, the control unit 56 starts the currently highlighted program. Pressing the on/off 74 button switches the appliance 2 and/or display 50 on or off.

Figure 3:
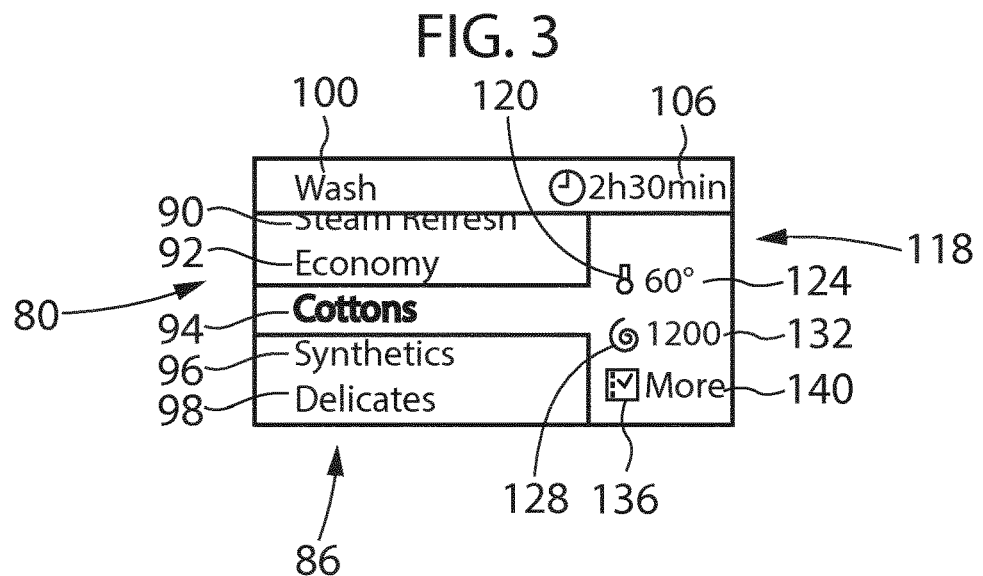
FIG. 3 shows a program screen with a plurality of washing programs.

Preferably after the on/off button push, an optional welcome message and/or initial or splash screen, a program screen 80 shown in FIG. 3 is displayed on touch display 50. Program screen 80 comprises a vertical or vertically arranged list 86 of washing programs 90, 92, 94, 96, 98 among which one, in the present example washing program 94 "Cotton" is highlighted. This highlighting is achieved in the present preferred embodiment by displaying washing program 94 in a lighter color, essentially white, compared to the other washing programs 90, 92, 96, 98 which are displayed in grey. The difference between the color of the highlighted program 94 and the non-highlighted programs 90, 92, 96, 98 is preferably chosen in such a way that the highlighting is easily detectable by the naked eye of an average user.

As shown in the example, of FIG. 3, preferably the highlighted program which is an operating function is shown essentially in the middle or center of list 86 and/or display 50 in vertical direction, which makes it even easier for the user to recognize the highlighted program. Preferably in the top left corner of touch display 50, the overall functionality 100 is shown which in the present preferred embodiment is "wash". For a combined washer/dryer or a dryer, corresponding terms can be displaced. In the right corner of touch display 50, the total time/duration 106 for the highlighted program is displayed.

The list of washing programs 90, 92, 94, 96, 98 is swipeable, i.e. the user can perform a swipe motion on the touch display 50 in the region where the list 86 is displayed in an essentially vertical direction upwards or downwards to make the list 86 scroll upwards or downwards. A swipe motion preferably comprises a movement of the user touch of the touch display in a direction while maintaining the touch or contact to the touch display during this movement. The swipe motion preferably comprises touching the touch display and moving this contact area across the touch display. The swipe motion is preferably performed by the user's finger. It can also be performed by a device of which its position on the touch display is recognizable by the touch display/control unit, such as a specific pen.

The way the list 86 is scrolling as a function of the swipe motion can be realized in two ways. In a preferred version or mode, a swiping movement upwards leads to a movement of the displayed washing programs in an upward direction, and new washing program can be placed at the bottom of the list. A downward swiping movement then leads to a downward movement of the washing programs. In an alternative version or mode, an upwards swiping movement results in a downwards movement of list entries and vice versa. A setting accessible by the user can be provided in the control unit 56 to change from one mode to the other. When list entries are scrolling, the one closest to the center or in the center of the touch display 50 and/or center of the vertical list 86 is highlighted.

Figure 5:
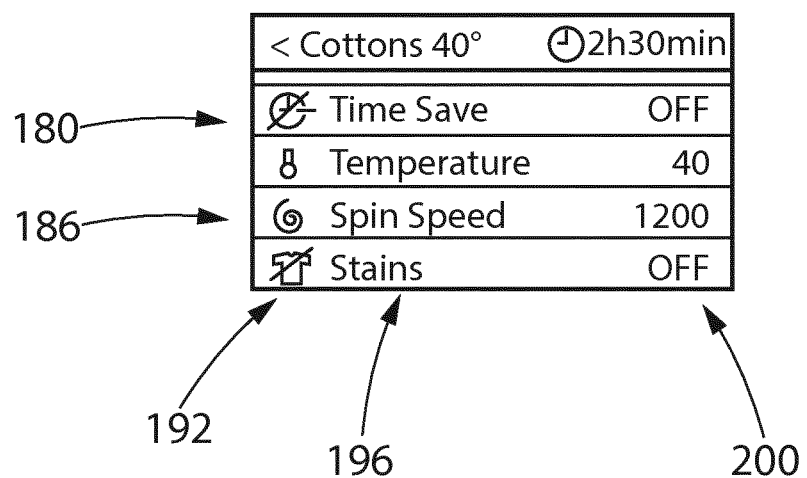
FIG. 5 shows an additional screen for a selected washing program.

On the right side of touch display 50, a list 118 of options is shown, whereby each option comprises a symbol and a value. A first pair of a symbol 120 and a value 124 is displayed in a top row of list 118, whereby symbol 120 preferably represents the temperature and value 124 preferably is the temperature value in degrees Celsius. A further symbol 128 preferably represents the spinning speed and value 132 represents its value. A still further symbol 136 preferably represents the possibility to enter on the option list. Instead of a matching value, the term "More" is preferably indicated as a displayed text in a touch region 140. When the user touches the display in the region 140, a supplemental screen shown in FIG. 5 is displayed.

In the program screen 80, a washing program 92, 94, 96, 98 can be selected by the user by touching it at least one time. The user in this way can select either the highlighted program or any other washing program which is an entry of list 86.

If or as long as the user does not touch a non-highlighted entry in list 86, the currently highlighted entry is the selected entry. If the user touches a non-highlighted list entry, this entry becomes the highlighted entry. The control unit therefore preferably registers a washing program as selected if it is in a highlighted state.

Figure 4:
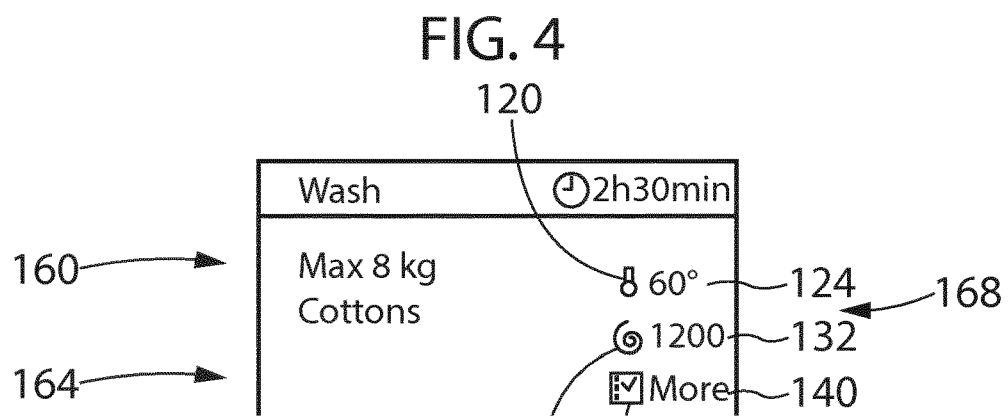
FIG. 4 shows a summary screen for a selected washing program.

If the start button 70 is pressed, appliance 2 starts the selected program with the option values that have been set/selected when the start button 70 is pressed. In FIG. 4, a summary screen 160 is displayed. Summary screen 160 is shown when the user touches a list entry of list 86 which is highlighted. Summary screen 160 on a left region 164 preferably displays the washing program and preferably, as shown here the maximum laundry load suitable or optimal for the chosen washing program. On a right region, option symbols and values are preferably displayed.

In FIG. 5, a supplemental screen 180 is shown which is displayed if the user preferably presses in the region 140 of screen 80 or 160 in which in the present embodiment the term "More" is displayed. While the screens 80 and 160 show the most relevant options, the supplemental screen 180 contains a preferably swipeable vertical list 186 of options. Each entry in list 186 preferably contains a symbol, a description, and value. The user can swipe through the list entries of list 186 in order to view all available options.

Figure 6:
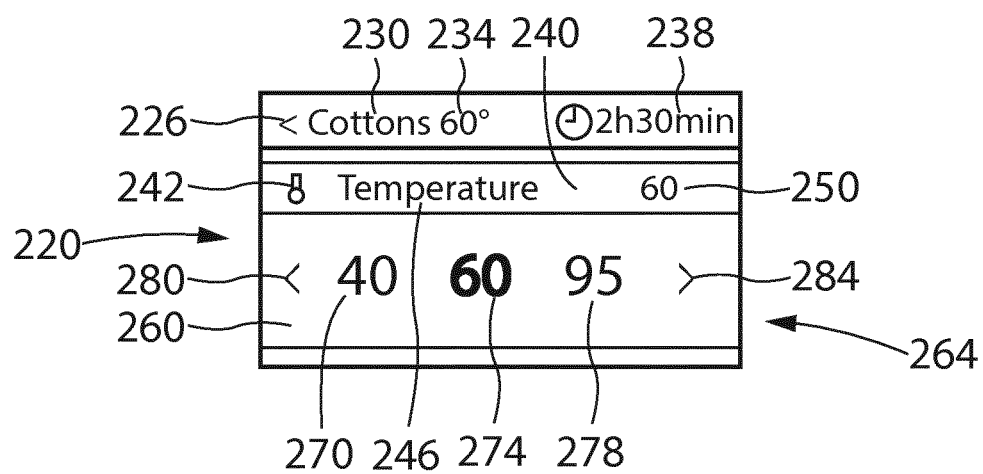
FIG. 6 shows an option screen.

When the user touches an option as displayed in FIG. 3, 4, or 5, an options screen 220 is displayed which is shown for the option "temperature" in FIG. 6. Options screen 220 in the top left corner preferably displays a back button 226 or backwards-pointing arrow which upon touch makes the control unit 56 show again on display the previously shown screen. Next to the back button 226, the name 230 of the washing program and the default temperature value 234 are preferably displayed. In the right corner, the duration 238 of the currently selected washing program is preferably displayed.

Options screen 220 also in a dedicated area 240 preferably displays the current option for which a value can be selected. The option "temperature" is displayed by a symbol 246, a textual description "Temperature" and the current value 250.

In a dedicated area 260, options screen 220 comprises a horizontal list 264 or horizontal row in which three temperature values 270, 274, 278 in rising order from left to right are shown. The center value 274 is highlighted. In the present preferred example, its font has a darker color than the non-highlighted values 270, 278. The highlighting can be performed in a variety of way by altering the font or the display style of the highlighted value 274. For example, the font can be varied in color and/or size and/or style and/or the background of the highlighted value 274 can be displayed differently than the background of the non-highlighted values.

The horizontal list 264 is preferably swipeable, i.e. It can be swiped by an essential or at least partly horizontal movement across the touch display 50. In the present example shown, swiping to the right would move the displayed values 270, 274, 278 to the right until the value 270, i.e. "40" is centered and highlighted. Swiping to the left would move the displayed values 270, 274, 278 to the left until the value 278, i.e. "95" is centered and highlighted. As described above in connection with the program screen, directions of swiping motion and motion of option values can be in opposite direction of each other.

In dedicated area 260, at the left borders of the displayed values 270, 274, 278, a left-pointing symbol 280 or arrow and a right-point symbol 284 or arrow are displayed. Touching the left-point-symbol 280 leads to a leftward movement of the displayed values by one value, such that the value 278 becomes centered. In this way, the user is offered an additional possibility to move the values. The highlighted value is the currently selected value. If the user presses start/pause button 70, the currently selected washing program is started together with the selected/highlighted value of the respective options screen.

The user thus has several options to set the desired temperature value. She/he can scroll through possible temperature values with arrows or scroll through possible temperature trough swipe on the values. The user can choose the preferred temperature directly touching by touching the value or go back to the previous screen touching the left arrow on the top left edge. In an equivalent manner, also other options screen for other parameters or options of the currently selected washing program are displayed if the user selects an option in the summary screen 160 or the supplemental screen 180.

In a preferred embodiment if the supplementary screen 180 or the option screen 220 is shown, if the user rotates the knob 38 the program screen 80 is automatically shown, allowing the scroll of the programs 90, 92, 94, 96, 98 as above described.

If the user touches a value or program which is not highlighted, it becomes the highlighted one. If the highlighted option is touched, the supplemental screen is shown.

The invention thus conceived can be subjected to numerous modifications and variants all falling within the scope of the inventive concept. In addition, all details can be replaced by other technically equivalent elements. In practice, all the materials used, as well as the shapes and contingent dimensions, may vary depending on the requirements without departing from the scope of protection of the following claims.

The invention claimed is:

1. A household appliance, comprising:
   a control panel;
   a control unit;
   a touch display on the control panel and connected to the control unit, wherein the control unit is configured to contemporaneously display a plurality of operating functions and a plurality of operating options on the touch display and to receive and to process user input selected from the plurality of operating functions, and wherein the touch display is configured to display the plurality of operating functions, including a highlighted operating function, and wherein each of the displayed operating functions is selectable by touching the touch display at a location of a corresponding one of the displayed operating functions at least one time; and
   a rotary knob physically arranged on a front panel of the control panel, wherein the rotary knob is configured to function in conjunction with the plurality of operating functions and at least one option displayed on the touch display, and wherein the appliance is configured such that turning the rotary knob changes the highlighted operating function.

2. The household appliance according to claim 1, wherein the operating functions are washing programs selectable by the user.

3. The household appliance according to claim 2, wherein the appliance is configured such that if a washing program is selected, the touch display shows a summary screen for the selected program showing at least one option of the selected program.

4. The household appliance according to claim 3, wherein the appliance comprises a start button, and wherein the appliance is configured such that, upon receiving a selection of a program or upon displaying the summary screen for the selected program, the appliance starts the selected program upon selection of the start button.

5. The household appliance according to claim 3, wherein the appliance is configured such that, upon displaying the summary screen, and receiving a specified user interaction, the touch screen displays the plurality of programs.

6. The household appliance according to claim 5, wherein the specified user interaction is a swipe motion.

7. The household appliance according to claim 2, wherein the washing programs are shown as a swipeable list.

8. The household appliance according to claim 7, wherein the swipeable list is a vertically arranged list.

9. The household appliance according to claim 1, wherein the operating functions and the at least one option are selectable by the user.

10. The household appliance according to claim 9, wherein the at least one option comprises an option symbol and/or option text and/or an option value.

11. The household appliance according to claim 9, wherein the appliance is configured to display an option screen upon selection of the at least one option, the option screen showing a plurality of option values with one of the plurality option values being highlighted, and wherein each of the plurality of option values is selectable by touching a respective option value at least one time.

12. The household appliance according to claim 11, wherein the plurality of option values is displayed as a swipeable list.

13. The household appliance according to claim 12, wherein the swipeable list is horizontally arranged.

14. The household appliance according to claim 11, wherein the appliance comprises a start button, and whereby, when an option value is highlighted and when the start button is pressed, the appliance starts a selected program with the highlighted option value.

* * * * *